United States Patent
Xia et al.

(10) Patent No.: US 9,986,574 B2
(45) Date of Patent: May 29, 2018

(54) CHANNEL SELECTION METRICS IN SHARED SPECTRUM

(71) Applicant: QUALCOMM Incorporated, San Diego, CA (US)

(72) Inventors: Ping Xia, San Diego, CA (US); Ahmed Kamel Sadek, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/687,264

(22) Filed: Apr. 15, 2015

(65) Prior Publication Data

US 2015/0305050 A1  Oct. 22, 2015

Related U.S. Application Data

(60) Provisional application No. 61/981,564, filed on Apr. 18, 2014, provisional application No. 62/013,412, filed on Jun. 17, 2014.

(51) Int. Cl.
*H04W 72/08* (2009.01)
*H04J 3/16* (2006.01)
(Continued)

(52) U.S. Cl.
CPC ......... *H04W 72/085* (2013.01); *H04J 3/1694* (2013.01); *H04W 16/14* (2013.01);
(Continued)

(58) Field of Classification Search
None
See application file for complete search history.

(56) References Cited

U.S. PATENT DOCUMENTS 5,963,848 A  10/1999 D'Avello
8,139,528 B2  3/2012 Gupta et al.
(Continued)

FOREIGN PATENT DOCUMENTS

EP  1257137 A2  11/2002
EP  2262338 A2  12/2010
(Continued)

OTHER PUBLICATIONS

International Search Report and Written Opinion—PCT/US2015/026203—ISA/EPO—dated Aug. 18, 2015.

*Primary Examiner* — Huy D Vu
*Assistant Examiner* — Hong Shao
(74) *Attorney, Agent, or Firm* — Muncy, Geissler, Olds & Lowe, P.C.

(57) ABSTRACT

Techniques for channel selection and related operations in a shared spectrum environment are disclosed. In one example, a channel selector or the like may be used to select one of a number of available channels as an operating channel based on a comparison of cost functions for each of the available channels, with the cost functions being based on separate utility and penalty metrics. In another example, a channel scanner or the like may be used to trigger a channel scan in response to a channel quality metric indicating poor service for a threshold number or proportion of access terminals. In another example, an operating mode controller may be used to trigger a Time Division Multiplexing (TDM) mode on an operating channel in response to a utilization metric being above a threshold. The TDM mode may cycle operation between activated and deactivated periods in accordance with a TDM communication pattern.

24 Claims, 11 Drawing Sheets

(51) Int. Cl.
*H04W 16/14* (2009.01)
*H04W 72/04* (2009.01)
*H04W 74/08* (2009.01)
*H04W 24/08* (2009.01)
*H04W 84/04* (2009.01)
*H04W 88/10* (2009.01)

(52) U.S. Cl.
CPC ....... *H04W 24/08* (2013.01); *H04W 72/0453* (2013.01); *H04W 72/08* (2013.01); *H04W 72/082* (2013.01); *H04W 74/0808* (2013.01); *H04W 84/045* (2013.01); *H04W 88/10* (2013.01)

(56) References Cited

U.S. PATENT DOCUMENTS

| | | |
|---|---|---|
| 8,588,148 B2 | 11/2013 | Huo et al. |
| 2004/0259555 A1* | 12/2004 | Rappaport ............ H04W 16/18 455/446 |
| 2005/0265288 A1 | 12/2005 | Liu et al. |
| 2006/0025149 A1 | 2/2006 | Karaoguz et al. |
| 2006/0029023 A1 | 2/2006 | Cervello et al. |
| 2008/0113692 A1 | 5/2008 | Zhao et al. |
| 2009/0221231 A1 | 9/2009 | Weng et al. |
| 2009/0285116 A1 | 11/2009 | Nanda et al. |
| 2009/0310565 A1 | 12/2009 | Huo et al. |
| 2010/0284303 A1* | 11/2010 | Catovic ................ H04W 24/02 370/254 |
| 2010/0316003 A1 | 12/2010 | Sukiasyan et al. |
| 2012/0040620 A1 | 2/2012 | Fu et al. |
| 2012/0058728 A1* | 3/2012 | Wang .................. H04W 72/085 455/62 |
| 2012/0082140 A1 | 4/2012 | Lin et al. |
| 2012/0093009 A1 | 4/2012 | Wang et al. |
| 2012/0184322 A1 | 7/2012 | Falconetti et al. |
| 2012/0252394 A1 | 10/2012 | Balakrishnan et al. |
| 2012/0276859 A1 | 11/2012 | Callender et al. |
| 2013/0064197 A1 | 3/2013 | Novak et al. |
| 2013/0083661 A1 | 4/2013 | Gupta et al. |
| 2013/0094390 A1 | 4/2013 | Chhabra |
| 2013/0165134 A1 | 6/2013 | Touag et al. |
| 2013/0203401 A1 | 8/2013 | Ryan et al. |
| 2013/0208587 A1 | 8/2013 | Bala et al. |
| 2013/0250787 A1 | 9/2013 | Zhang |
| 2013/0260807 A1 | 10/2013 | Suresh |
| 2014/0086081 A1 | 3/2014 | Mack et al. |
| 2015/0009962 A1 | 1/2015 | Clegg |
| 2015/0063323 A1 | 3/2015 | Sadek et al. |
| 2015/0156693 A1* | 6/2015 | Tabet .................... H04W 36/30 455/437 |
| 2015/0282064 A1 | 10/2015 | Patil et al. |
| 2015/0305040 A1 | 10/2015 | Xia et al. |
| 2015/0305051 A1 | 10/2015 | Xia |
| 2016/0037560 A1 | 2/2016 | Liu et al. |

FOREIGN PATENT DOCUMENTS

| | | |
|---|---|---|
| EP | 2675205 A2 | 12/2013 |
| EP | 2696530 A2 | 2/2014 |
| WO | 2009096980 | 8/2009 |

* cited by examiner

CHANNEL SELECTION METRICS IN SHARED SPECTRUM

CROSS-REFERENCE TO RELATED APPLICATIONS

The present Application for Patent claims the benefit of U.S. Provisional Application No. 61/981,564, entitled "CHANNEL SELECTION MEASUREMENT PRE-PROCESSING IN UNLICENSED SPECTRUM," filed Apr. 18, 2014, and U.S. Provisional Application No. 62/013,412, entitled "CHANNEL SELECTION TO REDUCE INTERFERENCE TO A WIRELESS LOCAL AREA NETWORK FROM A CELLULAR NETWORK," filed Jun. 17, 2014, each assigned to the assignee hereof, and each expressly incorporated herein by reference in its entirety.

REFERENCE TO CO-PENDING APPLICATIONS FOR PATENT

The present Application for Patent is also related to the following co-pending U.S. patent application Ser. Nos. 14/687,411: "CHANNEL SELECTION SCANNING IN SHARED SPECTRUM," and 14/687,600 "CHANNEL SELECTION CO-EXISTENCE IN SHARED SPECTRUM," each filed concurrently herewith, each assigned to the assignee hereof, and each expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency band such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for channel selection and related operations in a shared spectrum environment are disclosed.

In one example, an access point apparatus for managing an operating channel of a first Radio Access Technology (RAT) over a communication medium shared with a second RAT is disclosed. The access point apparatus may include, for example, one or more transceivers, a penalty metric generator, a utility metric generator, a cost function generator, and a channel selector. The one or more transceivers may be configured to perform at the access point a scan of available channels and to receive from an access terminal channel measurement reports for the available channels. The penalty metric generator may be configured to determine a penalty metric for each of the available channels based on the channel scan. The utility metric generator may be configured to determine a utility metric for each of the available channels based on the channel measurement reports. The cost function generator may be configured to compute a cost function for each of the available channels based on the respective penalty metrics and the respective utility metrics. The channel selector may be configured to select one of the available channels as the operating channel based on a comparison of the cost functions for each of the available channels.

In another example, a method for managing an operating channel of a first RAT over a communication medium shared with a second RAT is disclosed. The method may include, for example, performing, at an access point, a scan of available channels; receiving, from an access terminal, channel measurement reports for the available channels; determining a penalty metric for each of the available channels based on the channel scan; determining a utility metric for each of the available channels based on the channel measurement reports; computing a cost function for each of the available channels based on the respective penalty metrics and the respective utility metrics; and selecting one of the available channels as the operating channel based on a comparison of the cost functions for each of the available channels.

In another example, another apparatus for managing an operating channel of a first RAT over a communication medium shared with a second RAT is disclosed. The apparatus may include, for example, means for performing, at an access point, a scan of available channels; means for receiving, from an access terminal, channel measurement reports for the available channels; means for determining a penalty metric for each of the available channels based on the channel scan; means for determining a utility metric for each of the available channels based on the channel measurement reports; means for computing a cost function for each of the available channels based on the respective penalty metrics and the respective utility metrics; and means for selecting one of the available channels as the operating channel based on a comparison of the cost functions for each of the available channels.

In another example, a computer-readable medium including code, which, when executed by a processor, causes the processor to perform operations for managing an operating channel of a first RAT over a communication medium shared with a second RAT is disclosed. The computer-readable medium may include, for example, code for performing, at an access point, a scan of available channels; code for receiving, from an access terminal, channel measurement reports for the available channels; code for determining a penalty metric for each of the available channels based on the channel scan; code for determining a utility metric for each of the available channels based on the channel measurement reports; code for computing a cost function for each of the available channels based on the respective penalty metrics and the respective utility metrics; and code for selecting one of the available channels as the operating channel based on a comparison of the cost functions for each of the available channels.

In another example, another access point apparatus for managing an operating channel of a first RAT over a communication medium shared with a second RAT is disclosed. The access point apparatus may include, for example, a transceiver, a channel quality analyzer, a channel scanner, and a channel selector. The transceiver may be configured to receive from each of a plurality of access terminals one or more channel measurement reports for a current operating channel of the first RAT. The channel quality analyzer may be configured to determine a channel quality metric for the current operating channel based on the channel measurement reports. The channel scanner may be configured to trigger a channel scan in response to the channel quality metric indicating poor service for a threshold number or proportion of the access terminals. The channel selector may be configured to select a new operating channel based on the channel scan.

In another example, another method for managing an operating channel of a first RAT over a communication medium shared with a second RAT is disclosed. The method may include, for example, receiving from each of a plurality of access terminals one or more channel measurement reports for a current operating channel of the first RAT; determining a channel quality metric for the current operating channel based on the channel measurement reports; triggering a channel scan in response to the channel quality metric indicating poor service for a threshold number or proportion of the access terminals; and selecting a new operating channel based on the channel scan.

In another example, another apparatus for managing an operating channel of a first RAT over a communication medium shared with a second RAT. The apparatus may include, for example, means for receiving from each of a plurality of access terminals one or more channel measurement reports for a current operating channel of the first RAT; means for determining a channel quality metric for the current operating channel based on the channel measurement reports; means for triggering a channel scan in response to the channel quality metric indicating poor service for a threshold number or proportion of the access terminals; and means for selecting a new operating channel based on the channel scan.

In another example, another computer-readable medium including code, which, when executed by a processor, causes the processor to perform operations for managing an operating channel of a first RAT over a communication medium shared with a second RAT is disclosed. The computer-readable medium may include, for example, code for receiving from each of a plurality of access terminals one or more channel measurement reports for a current operating channel of the first RAT; code for determining a channel quality metric for the current operating channel based on the channel measurement reports; code for triggering a channel scan in response to the channel quality metric indicating poor service for a threshold number or proportion of the access terminals; and code for selecting a new operating channel based on the channel scan.

In another example, another access point apparatus for managing an operating channel of a first RAT over a communication medium shared with a second RAT is disclosed. The access point apparatus may include, for example, one or more transceivers, a channel selector, an interference analyzer, and an operating mode controller. The one or more transceivers may be configured to perform at the access point a scan of available channels. The channel selector may be configured to select one of the available channels as the operating channel of the first RAT based on the channel scan. The interference analyzer may be configured to determine a utilization metric for the operating channel. The operating mode controller may be configured to trigger a Time Division Multiplexing (TDM) mode on the operating channel in response to the utilization metric being above a threshold, wherein the TDM mode cycles operation between activated periods and deactivated periods of communication in accordance with a TDM communication pattern.

In another example, another method for managing an operating channel of a first RAT over a communication medium shared with a second RAT is disclosed. The method may include, for example, performing, at an access point, a scan of available channels; selecting one of the available channels as the operating channel of the first RAT based on the channel scan; determining a utilization metric for the operating channel; and triggering a TDM mode on the operating channel in response to the utilization metric being above a threshold, wherein the TDM mode cycles operation between activated periods and deactivated periods of communication in accordance with a TDM communication pattern.

In another example, another apparatus for managing an operating channel of a first RAT over a communication medium shared with a second RAT is disclosed. The apparatus may include, for example, means for performing, at an access point, a scan of available channels; means for selecting one of the available channels as the operating channel of the first RAT based on the channel scan; means for determining a utilization metric for the operating channel; and means for triggering a TDM mode on the operating channel in response to the utilization metric being above a threshold, wherein the TDM mode cycles operation between activated periods and deactivated periods of communication in accordance with a TDM communication pattern.

In another example, another computer-readable medium including code, which, when executed by a processor, causes the processor to perform operations for managing an operating channel of a first RAT over a communication medium shared with a second RAT is disclosed. The computer-readable medium may include, for example, code for performing, at an access point, a scan of available channels; code for selecting one of the available channels as the operating channel of the first RAT based on the channel scan; code for determining a utilization metric for the operating channel; and code for triggering a TDM mode on the operating channel in response to the utilization metric being above a threshold, wherein the TDM mode cycles operation between activated periods and deactivated periods of communication in accordance with a TDM communication pattern.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to channel selection and related operations in a shared spectrum environment. According to certain aspects, one of a number of available channels may be selected as an operating channel based on a comparison of cost functions for each of the available channels, with the cost functions being based on separate utility and penalty metrics. According to other aspects, a channel scan for a new operating channel may be triggered in response to a channel quality metric indicating poor service for a threshold number or proportion of access terminals. According to other aspects, a Time Division Multiplexing (TDM) mode may be triggered on an operating channel in response to a utilization metric being above a threshold. An example TDM communication scheme is referred to herein as Carrier Sense Adaptive Transmission (CSAT), which may be used to define a series of activated and deactivated periods of operation on a given communication medium.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
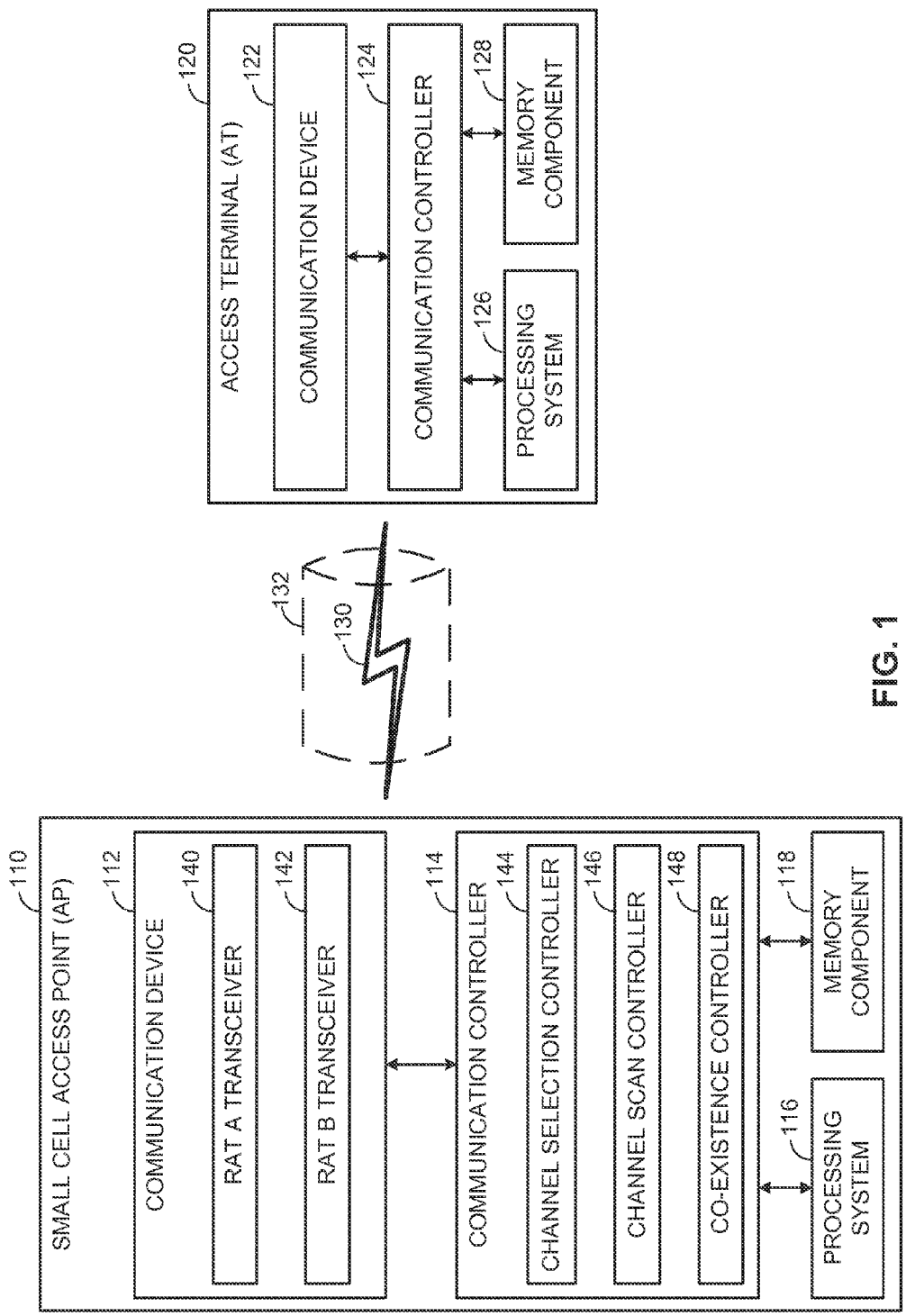
FIG. 1 illustrates an example wireless communication system including a Small Cell Access Point (AP) in communication with an Access Terminal (AT).

FIG. 1 illustrates an example wireless communication system including a Small Cell Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (JOT)/Internet of Everything (JOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. "Small cells" generally refer to a class of low-powered access points that may include or be otherwise referred to as femto cells, pico cells, micro cells, Wi-Fi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate over a communication channel of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

As a particular example, the medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points as in the system of FIG. 1, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two co-located transceivers operating according to respective RATs, including a "RAT A" transceiver 140 and a "RAT B" transceiver 142. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing) . Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The RAT A transceiver 140 and the RAT B transceiver 142 may provide different functionalities and may be used for different purposes. As an example, the RAT A transceiver 140 may operate in accordance with Long Term Evolution (LTE) technology to provide communication with the access terminal 120 on the wireless link 130, while the RAT B transceiver 142 may operate in accordance with Wi-Fi technology to monitor Wi-Fi signaling on the medium 132 that may interfere with or be interfered with by the LTE communications. The communication device 122 of the access terminal 120 may, in some designs, include similar RAT A transceiver and/or RAT B transceiver functionality, as desired.

As will be discussed in more detail below with reference to FIGS. 2-5, the communication controller 114 of the access point 110 may variously include a channel selection controller 144, a channel scan controller 146, and/or a co-existence controller 148, which may operate in conjunction with the RAT A transceiver 140 and the RAT B transceiver 142 to manage operation on the medium 132. It will be appreciated from the discussion below that one or more of these components may be omitted in different designs when their respective functionality is not desired. It is not necessary that the channel selection controller 144, the channel scan controller 146, and the co-existence controller 148 be deployed in combination with each other.

Figure 2:
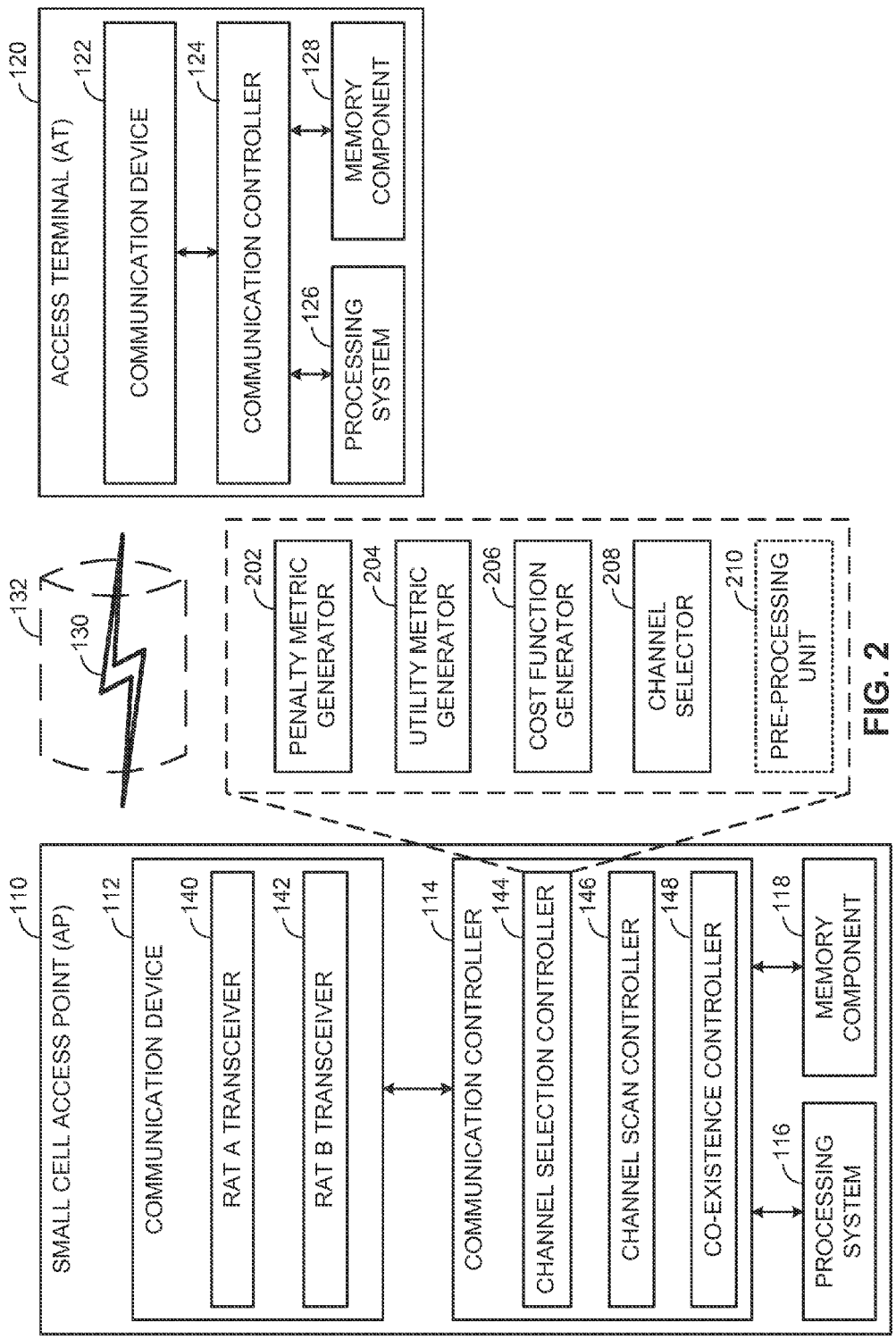
FIG. 2 is a block diagram illustrating certain example aspects of a channel selection controller in more detail.

FIG. 2 is a block diagram illustrating certain example aspects of the channel selection controller 144 of FIG. 1 in more detail. As shown, the channel selection controller 144 may include a penalty metric generator 202, a utility metric generator 204, a cost function generator 206, and a channel selector 208.

In order to assess the viability of various channels available for use on the medium 132 for communication on the wireless link 130, the communication device 112 via the RAT A transceiver 140 and/or the RAT B transceiver 142 may be configured to perform, at the access point 110, a scan of the available channels, and to receive, from the access terminal 120, channel measurement reports for the available channels. For example, the RAT A transceiver 140 may perform a scan of the available channels (e.g., via a corresponding LTE Network Listen Module (NLM) or the like) for signaling energy (e.g., signal strength in the form of a Reference Signal Received Power (RSRP)), which may be general or specific to RAT A communication. Similarly, the RAT B transceiver 142 may perform a scan of the available channels (e.g., via a corresponding Wi-Fi Network Listen Module (NLM) or the like) for signaling energy (e.g., signal strength in the form of a Received Signal Strength Indication (RSSI)), which may be general or specific to RAT B communication. Meanwhile, the access terminal 120 may send the access point 110 channel measurement reports for the available channels in accordance with the RAT employed by the access terminal 120 (e.g., LTE-based measurements from an LTE User Equipment (UE), Wi-Fi-based measurements from an IEEE 802.11k-capable Wi-Fi Subscriber Station (STA), etc.).

Based on the channel scan, the penalty metric generator 202 may be configured to determine a penalty metric for each of the available channels. The penalty metrics may correspond to a measure of a performance benefit provided by selecting a respective channel as the operating channel. For example, the penalty metrics may be implemented as a proportional fair throughput metric that takes into account a minimum level of service to be afforded to competing uses of the channel in accordance with RAT B. As discussed above, the channel scan performed by the RAT A transceiver 140 and/or the RAT B transceiver 142 may identify a signal strength measurement for each of the available channels, such that the penalty metric generator 202 may determine the penalty metrics as a function of the signal strength measurements Based on the channel measurement reports, the utility metric generator 204 may be configured to determine a utility metric for each of the available channels. The utility metrics may correspond to a measure of a performance benefit provided by selecting a respective channel as the operating channel. For example, the utility metrics may be implemented as a proportional fair throughput metric that takes into account a maximum total throughput on the channel for communication in accordance with RAT A. As discussed above, the channel measurement reports received from the access terminal 120 may identify a signal strength measurement for the access point 110 and a signal strength measurement for one or more neighboring access points visible to the access terminal 120, such that the utility metric generator 204 may determine the utility metrics as a function of the signal strength measurements.

As a particular example for illustration purposes, an LTE/Wi-Fi co-existence environment will be described below where the access point 110 includes an LTE eNB transceiver for the RAT A transceiver 140 and a co-located Wi-Fi AP transceiver for the RAT B transceiver 142, the LTE eNB transceiver being in communication with a first access terminal 120 (i.e., an LTE UE) and the Wi-Fi AP transceiver being in communication with a second access terminal 120 (i.e., a Wi-Fi STA). In this example, two metrics are determined: (1) a utility metric $U_n$ capturing the performance benefit provided by selecting a given channel n as an LTE operating channel and (2) a penalty metric $P_n$ capturing the performance impact caused by selecting that channel n.

As discussed above, in general, LTE UE measurements and Wi-Fi STA measurements (e.g., from IEEE 802.11k-capable STAs) may be used to derive the utility metric $U_n$, whereas LTE eNB measurements and co-located Wi-Fi AP measurements (e.g., using respective NLMs) may be used to derive the penalty metric $P_n$. This division and the splitting of UE/STA measurements into a separate utility metric may be employed because UEs do not generate interference, as their RSRPs are merely indications of hidden LTE nodes and any affected hidden LTE nodes can switch channels if their utility is low. Thus, in the end, every LTE device is able to achieve efficient operation (e.g., Nash-optimal efficiency). Similarly, STAs are also receivers, and their measurements act to balance LTE UE measurements in the utility metric $U_i$.

The UE and STA components of the utility metric $U_n$ may be constructed as proportional fair throughput metrics, for example, as follows:

$$UE = \sqrt[N_{ue}]{\Pi_i^{N_{ue}} \log_2\left(1 + \frac{RSRP\_i}{\sum RSRP\_neighbor}\right)} \quad \text{(Eq. 1)}$$

$$802.11k\ STA = \sqrt[N_{11k}]{\Pi_i^{N_{11k}} \log_2\left(1 + \frac{a}{\sum Bcn\_RSSI}\right)} \quad \text{(Eq. 2)}$$

For the UE metric component, RSRP_i is the LTE eNB's RSRP to UE i and ΣRSRP_neighbor is the sum RSRP of neighboring cells detected by UE i, as discussed above. For the STA metric, ΣBcn_RSSI is the sum RSSI of neighboring Wi-Fi beacons detected by each STA i and a is a configurable parameter that can be set to adjust the level of Wi-Fi protection. In general, the higher the value for a the less protection is afforded to Wi-Fi. This configurable parameter a may be used instead of the STA's signal strength, for example, because the STA's signal strength may be relatively high and otherwise mask a potentially strong interference to a hidden Wi-Fi Basic Service Set (BSS) (which may not be able to switch channels).

The total channel utility metric $U_n$ may accordingly be constructed as a sum of the UE and STA components as follows:

$$U_n = \sqrt[N_{ue}]{\Pi_i^{N_{ue}} \log_2\left(1 + \frac{RSRP\_i}{\sum RSRP\_neighbor}\right)} + \quad \text{(Eq. 3)}$$
$$\sqrt[N_{11k}]{\Pi_i^{N_{11k}} \log_2\left(1 + \frac{a}{\sum Bcn\_RSSI}\right)}$$

Turning to the example penalty metric $P_n$, this metric may be generally composed in this example of different penalty components reflecting the channel RSSI, the individual Wi-Fi beacon RSSIs, intra-operator LTE RSRPs, inter-operator LTE RSRPs, etc. An example is as follows:

$$P_n = q_{i,0} + s_i + \Sigma_{j \in CH_i} q_{wlan,i,j} + \Sigma_{l \in CH_i\_same\_op} q\_same\_op_{LTE,i,l} + \Sigma_{m \in CH_i\_diff\_op} q\_diff\_op_{LTE,i,m} \quad \text{(Eq. 4)}$$

Here, $q_{i,0}$ is the channel RSSI penalty, $s_i$ is the cost associated with the spectral scan measurement to detect non-Wi-Fi/non-LTE, artificial noise in the channel, $q_{wlan,i,j}$ is the penalty for the $j^{th}$ beacon RSSI from a Wi-Fi AP scan, $q\_same\_op_{LTE,i,l}$ is the penalty for the $l^{th}$ same-operator RSRP from an eNB NLM scan, and $q\_diff\_op_{LTE,i,m}$ is the penalty for the $m^{th}$ different-operator RSRP from an eNB NLM scan. The various q values may be assigned (e.g., low, moderate, or high) based on different thresholds for their corresponding measurements.

Returning to FIG. 2, the cost function generator 206 may be configured to compute a cost function for each of the available channels based on the respective penalty metrics and the respective utility metrics. Based on a comparison of the cost functions for each of the available channels, the channel selector 208 may be configured to select one of the available channels as the operating channel.

As is further illustrated in FIG. 2, in some designs, the communication controller 114 may further include an optional pre-processing unit 210 configured to aggregate the channel measurement reports for each of the available channels on a per-access-terminal basis, which may better capture expected user experience at the device level. For example, the pre-processing unit 210 may be configured to aggregate the channel measurement reports by generating a linear sum of the measurements associated with each of the available channels (e.g., a linear sum across different neighboring access points visible to the access terminal 120 on a given channel).

Table 1 below provides a particular example for illustration purposes of RSSI measurement reporting by two example access terminals (DEVICE_1 and DEVICE_2) monitoring two example channels (CHANNEL_1 and CHANNEL_2).

TABLE 1

| ACCESS TERMINAL | MEASUREMENT | CHANNEL_1 | CHANNEL_2 |
|---|---|---|---|
| DEVICE_1 | RSSI measurement from first strongest neighbor | −50 dBm | −50 dBm |
|  | RSSI measurement from second strongest neighbor | −70 dBm | −80 dBm |
| DEVICE_2 | RSSI measurement from first strongest neighbor | −80 dBm | −70 dBm |

As shown, the associated access terminals may each provide one or multiple measurement reports for various neighbor cells. In the example of Table 1, the first access terminal provides two RSSI measurement reports from different neighbor cells while the second access terminal provides one RSSI measurement report from one neighbor cell. If each of the measurements is treated independently, the same three RSSI measurement results will be observed in each channel—i.e., −50 dBm, −70 dBm, and −80 dBm— and these two channels will be considered to be the same in terms of radio interference. However, the first channel may in fact be a better selection than the second channel in terms of interference because the first access terminal sees roughly the same interference in the first channel as compared to the second channel, but the second access terminal experiences substantially lower interference in the second channel.

Instead of blindly treating the measurements independently, the pre-processing unit 210 may be employed to aggregate these measurements on a per-device rather than per-measurement basis. In the numerical example of Table 1, the pre-processing unit 210 may aggregate the two RSSI measurement reports provided by the first access terminal as shown below in Table 2.

TABLE 2

| ACCESS TERMINAL | MEASUREMENT | AGGREGATED CHANNEL_1 | AGGREGATED CHANNEL_2 |
| --- | --- | --- | --- |
| DEVICE_1 | RSSI measurement from first strongest neighbor RSSI measurement from second strongest neighbor | −49.99 dBm | −49.95 dBm |
| DEVICE_2 | RSSI measurement from first strongest neighbor | −80 dBm | −70 dBm |

As illustrated here, such pre-processing may be used to reveal how the first channel is a better selection than the second channel in terms of interference. In particular, it can be seen that the first access terminal sees roughly the same interference in the first channel as compared to the second channel (i.e., −49.99 dBm vs. −49.95 dBm) while the second access terminal experiences substantially lower interference in the second channel (i.e., −80 dBm vs. −70 dBm).

Figure 3:
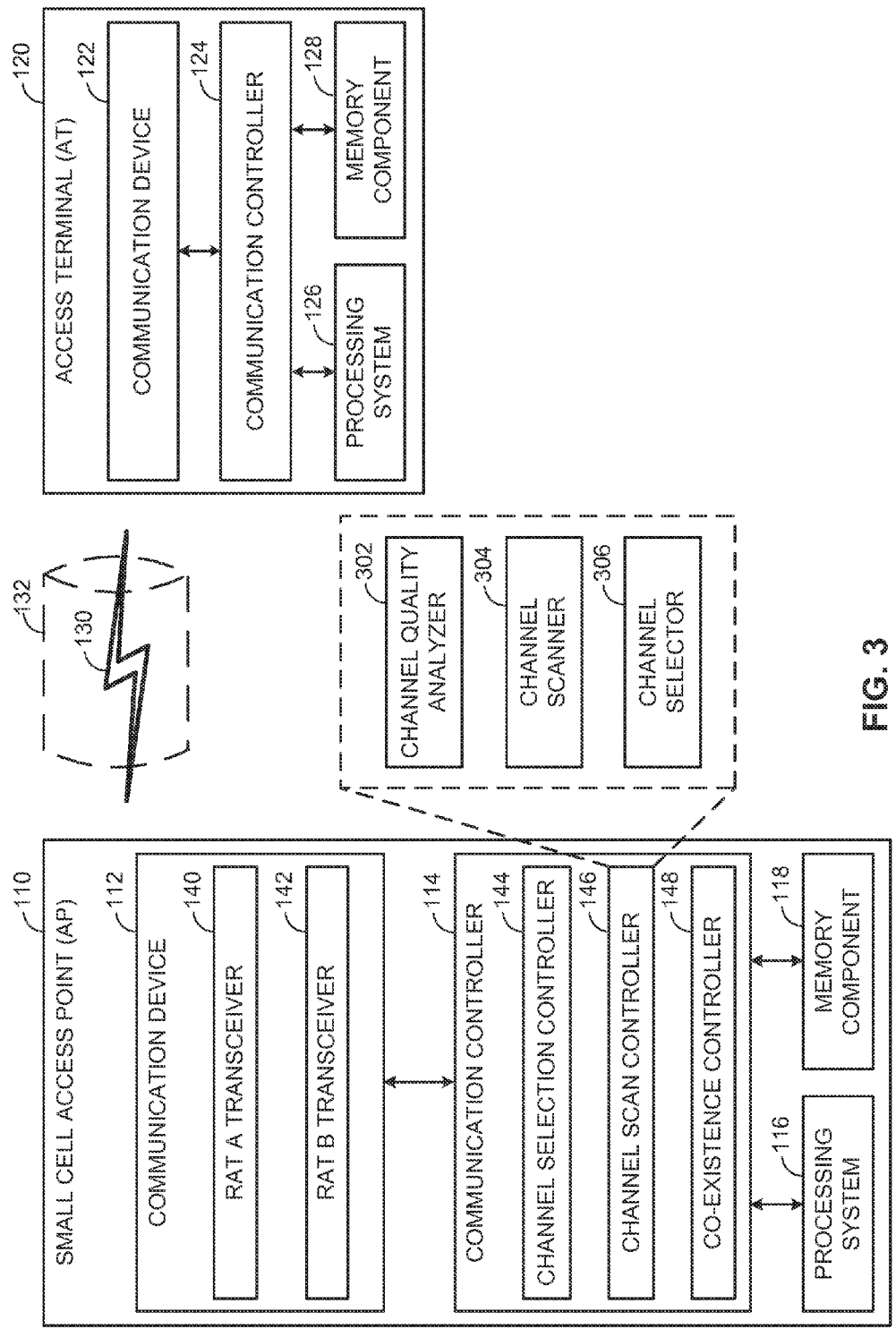
FIG. 3 is a block diagram illustrating certain example aspects of a channel scan controller in more detail.

FIG. 3 is a block diagram illustrating certain example aspects of the channel scan controller 146 of FIG. 1 in more detail. As shown, the channel scan controller 146 may include a channel quality analyzer 302, a channel scanner 304, and a channel selector 306.

In order to assess when it may be desired or necessary to trigger a channel scan for a new operating channel for use on the medium 132 for communication on the wireless link 130, the communication device 112 via the RAT A transceiver 140 and/or the RAT B transceiver 142 may be configured to receive from each of a plurality of access terminals 120 one or more channel measurement reports for a current operating channel (e.g., the RAT A transceiver 140 may receive channel measurement reports for the operating channel of RAT A). The channel measurement reports may include or be used to derive various information relating to the level of service experienced at each of the access terminals 120, such as a Channel Quality Indicator (CQI), a Packet Error Rate (PER), a Modulation and Coding Scheme (MCS), and so on.

Based on the channel measurement reports, the channel quality analyzer 302 may be configured to determine a channel quality metric for the current operating channel. The channel quality metric may be used to give an indication of the number or proportion of the access terminals 120 that are experiencing an acceptable level of service on the current operating channel. For example, the service level experienced by each of the access terminals 120 (e.g., in terms of CQI, PER, and/or MCS values or statistics) may be compared to a service level threshold, and the channel quality metric may be determined as an indicator function averaged across the comparisons. The service level threshold may correspond to a predetermined minimum level of service or a dynamic minimum level of service. A dynamic minimum level of service may be derived from an expected service level based on signaling from the operating RAT alone (e.g., LTE serving cell and neighboring cell signaling) in the ideal case of no interfering RAT signaling (e.g., Wi-Fi interference signaling), as well as an offset value configurable as a backoff parameter.

The channel scanner 304 may be configured to trigger a channel scan in response to the channel quality metric indicating poor service for a threshold number or proportion of the access terminals 120. In general, the threshold number or proportion of the access terminals 120 may be a predetermined value or set dynamically. Returning to the example above of the channel quality metric being determined as an indicator function averaged across access terminal service level determinations, the threshold may correspond to a desired percentage of the access terminals being adequately served on the current operating channel, below which it may be considered necessary to switch operating channels.

In some designs, the channel scanner 304 may be configured to trigger the channel scan further in response to the channel quality metric indicating the poor service for a threshold amount of time. Adding a temporal component to the analysis may help to reduce false positives where the channel quality dips for only a short amount of time, which would not be sufficient to justify the overhead associated with an operating channel switch. Such a threshold amount of time may be adapted as appropriate for the operating environment. For example, the channel scanner 304 may be further configured to set the threshold amount of time based on a Discontinuous Reception (DRX) configuration of the access terminals 120 (if employed) to account for periodic or intermittent inactivity.

As a particular example for illustration purposes, an LTE/Wi-Fi co-existence environment will be described below where the access point 110 includes an LTE eNB transceiver for the RAT A transceiver 140 and each of the access terminals 120 corresponds to an LTE UE. In this example, a new channel scan may be triggered by a low CQI condition where the proportion of UEs being adequately served on the current operating channel drops below a threshold for a period of time, thereby prompting a "panic" scan for a new channel. An example CQI-based channel quality metric may be calculated as follows:

$$\frac{\sum_{1}^{N} 1\left(CQI_i < \min\left(CQI_{min}, \widehat{CQ}I\left(\frac{RSRP_i}{\sum RSRP_{neighbor}}\right) - \Delta\right)\right)}{N} > THR_{out},$$ (Eq. 5)

for at least time $T_{out}$

Here, 1(•) is the indicator function generating a true (e.g., '1') indication or false (e.g., '0') indication of adequate service for UE i (out of N total UEs), $RSRP_i$ is the signal strength from the eNB to UE i $\Sigma RSRP_{neighbor}$ is the sum of neighboring cell signal strengths detected by UE i, $\widehat{CQ} I(x)$ is an estimated CQI based on LTE signaling (e.g., a Signal-to-Interference-plus-Noise Ratio (SINR) derived from the UE RSRP measurements and specific UE category), and Δ is a configurable CQI back-off parameter.

Returning to FIG. 3, the channel selector 306 may be configured to select a new operating channel based on the channel scan. In some instances, the new operating channel may be different from the current operating channel. In other instances, the new operating channel may be the same as the current operating channel.

Figure 4:
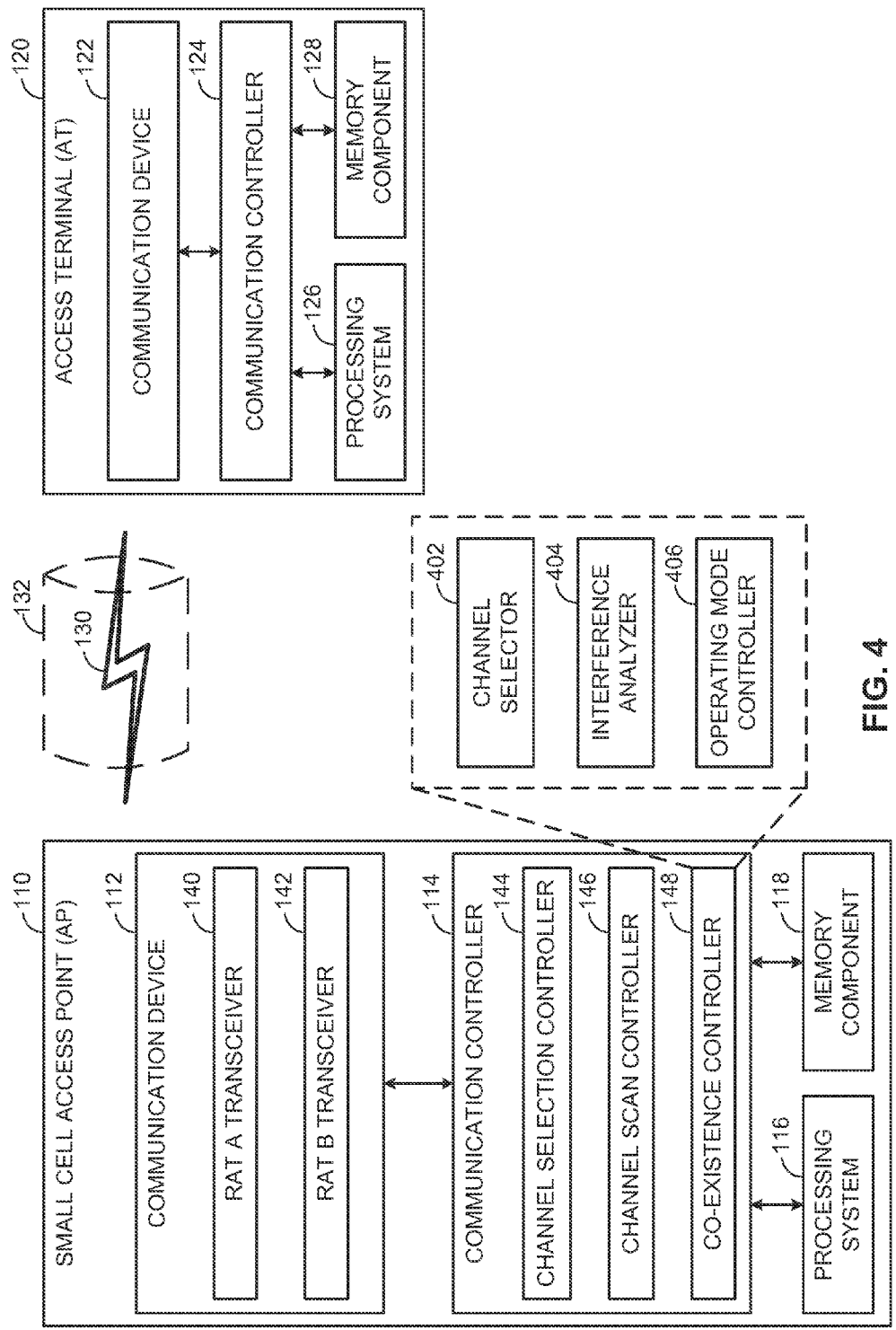
FIG. 4 is a block diagram illustrating certain example aspects of a co-existence controller in more detail.

FIG. 4 is a block diagram illustrating certain example aspects of the co-existence controller 148 of FIG. 1 in more detail. As shown, the co-existence controller 148 may include a channel selector 402, an interference analyzer 404, and an operating mode controller 406. As discussed above, the communication device 112 via the RAT A transceiver 140 and/or the RAT B transceiver 142 may be configured to perform, at the access point 110, a scan of the available channels. Based on the channel scan, the channel selector 402 may be configured to select one of the available channels as the operating channel.

In order to assess when it may be desired or necessary to trigger a special operating mode for fostering inter-RAT co-existence on the medium 132 (e.g., when the operating channel is particularly crowded), the interference analyzer 404 may be configured to determine a utilization metric for the operating channel. The utilization metric may take into account interference from either RAT A (e.g., LTE), RAT B (e.g., Wi-Fi), or a combination thereof. For example, the utilization metric may take into account the number of other nodes sharing the operating channel (e.g., via the number of beacon signals or other unique identifiers detected), the manner in which those nodes are using the operating channel (e.g., as a primary channel or as a secondary channel), the proximity of those other nodes (e.g., as a function of signal strength), and so on. The operating mode controller 406 may be accordingly configured to trigger a Time Division Multiplexing (TDM) mode on the operating channel in response to the interference metric being above a threshold. In general, the TDM mode may be used to cycle operation between activated periods and deactivated periods of communication in accordance with a TDM communication pattern.

Figure 5:
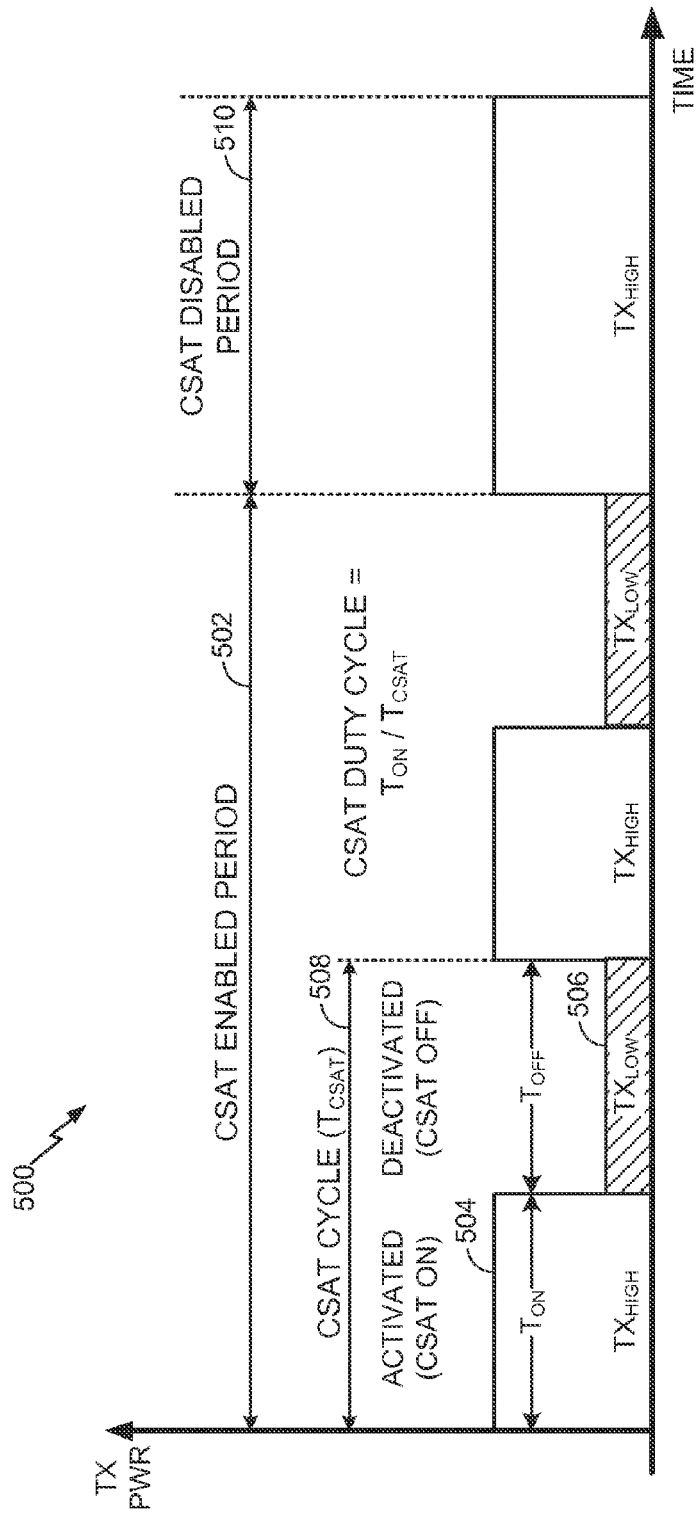
FIG. 5 illustrates certain aspects of an example Time Division Multiplexing (TDM) communication scheme referred to herein as Carrier Sense Adaptive Transmission (CSAT) that may be used to implement a TDM mode of operation.

FIG. 5 illustrates certain aspects of an example TDM communication scheme referred to herein as Carrier Sense Adaptive Transmission (CSAT) that may be used to implement a TDM mode of operation on the medium 132. A CSAT communication scheme may be used to foster co-existence between RAT A communications between the access point 110 and access terminal 120 and other-RAT communications between neighboring devices operating according to RAT B, for example, by cycling operation of RAT A over the medium 132 (e.g., on a corresponding Secondary Cell (SCell) provided by the access point 110 on the unlicensed band) in accordance with a TDM communication pattern 500. A CSAT communication scheme as provided herein may offer several advantages for mixed-RAT co-existence environments.

As shown, during a CSAT enabled period 502, operation of RAT A may be cycled over time between activated (CSAT ON) periods 504 and deactivated (CSAT OFF) periods 506. A given activated period 504/deactivated period 506 pair may constitute a CSAT cycle ($T_{CSAT}$) 508. During a period of time $T_{ON}$ associated with each activated period 504, RAT A transmission on the medium 132 may proceed at a normal, relatively high transmission power. During a period of time $T_{OFF}$ associated with each deactivated period 506, however, RAT A transmission on the medium 132 is reduced or even fully disabled to yield the medium 132 to neighboring devices operating according to RAT B. By contrast, during a CSAT disabled period 510, the cycling may be disabled.

Returning to FIG. 4, the utilization metric may correspond to a measure of interference from signaling on the operating channel that is associated with either RAT A for which the operating channel is being selected, RAT B for which co-existence on the operating channel is being managed, or a combination thereof.

As an example, the utilization metric may correspond to a measure of interference from signaling on the operating channel that is associated with RAT B (e.g., Wi-Fi). The RAT B signaling may correspond to one or more beacons on a primary channel or a secondary channel that are associated with the second RAT and exceed a signal strength threshold (e.g., RSSI greater than a minimum level). In Wi-Fi for example, the IEEE 802.11 protocol family of standards provides for operation of a primary 20 MHz channel as well as optionally using secondary adjacent channels (e.g., extension channels) spaced ±20 MHz away. The secondary channels may be used for channel bonding to increase the Wi-Fi bandwidth to, for example, 40 MHz, 80 MHz, or 160 MHz. In the scenario where a Wi-Fi AP is using channel bonding of two 20 MHz channels to form a 40 MHz channel, or four 20 MHz channels to form an 80 MHz channel, and so on, one of the 20 MHz channels will be specified as a primary channel and the rest of the channels as secondary channels.

The TDM pattern may be set differently when the signaling corresponds to a primary channel as opposed to a secondary channel. When the beacons exceed a threshold number on the primary channel, the operating mode controller 406 may be configured to trigger the TDM mode with a first set of parameters for the TDM pattern (e.g., a relatively short CSAT duty cycle $T_{CSAT}$ with shorter but more frequent transmission gaps). By contrast, when the beacons exceed a threshold number on the secondary channel, the operating mode controller 406 may be configured to trigger the TDM mode with a second set of parameters for the TDM pattern (e.g., a relatively long CSAT duty cycle $T_{CSAT}$ with longer but less frequent transmission gaps).

As another example, the utilization metric may correspond to a measure of interference from signaling on the operating channel that is associated with RAT A (e.g., LTE). The TDM pattern may be set differently based on the number of access points operating in accordance with RAT A on the operating channel. When the signaling identifies at least a threshold number of access points operating in accordance with RAT A on the operating channel (e.g., via a distinct number of Physical Cell Identifiers (PCIs) or the like), the operating mode controller 406 may be configured to trigger the TDM mode with a first set of parameters for the TDM pattern (e.g., a relatively long CSAT duty cycle $T_{CSAT}$ with longer but less frequent transmission gaps). By contrast, when the signaling identifies less than a threshold number of access points operating in accordance with RAT A on the operating channel, the operating mode controller 406 may be configured to trigger the TDM mode with a second set of parameters for the TDM pattern (e.g., a relatively short CSAT duty cycle $T_{CSAT}$ with shorter but more frequent transmission gaps).

The operating mode controller 406 may be further configured, in some designs, to modify one or more parameters of the TDM pattern in response to the utilization metric being above the threshold used to trigger the TDM mode in the first place. For example, the operating mode controller 406 may be configured to modify one or more parameters of the TDM pattern at a next scheduled channel scan in order to dynamically adapt to current channel conditions. The parameters may include, for example, a duty cycle, a transmission power, a cycle timing of the TDM pattern, and so on.

In the example of FIG. 5, each of the associated CSAT parameters, including, for example, a duty cycle (i.e., $T_{ON}/T_{CSAT}$) and the respective transmission powers during activated periods 504 and deactivated periods 506, may be adapted based on the current signaling conditions on the medium 132 to dynamically optimize the CSAT communication scheme. For example, the RAT B transceiver 142 configured to operate in accordance with RAT B (e.g., Wi-Fi) may be further configured to monitor the medium 132 for RAT B signaling, which may interfere with or be interfered with by RAT A communications over the medium 132. Based on the utilization metric, the associated parameters may be set and the RAT A transceiver 140 configured to operate in accordance with RAT A (e.g., LTE) may be further configured to cycle between activated periods 504 of communication and deactivated periods 506 of communication over the medium 132 in accordance therewith. As an example, if the utilization metric is high (e.g., above a threshold), one or more of the parameters may be adjusted such that usage of the medium 132 by the RAT A transceiver 140 is reduced (e.g., via a decrease in the duty cycle or transmission power). Conversely, if the utilization metric is low (e.g., below a threshold), one or more of the parameters may be adjusted such that usage of the medium 132 by the RAT A transceiver 140 is increased (e.g., via an increase in the duty cycle or transmission power).

Figure 6:
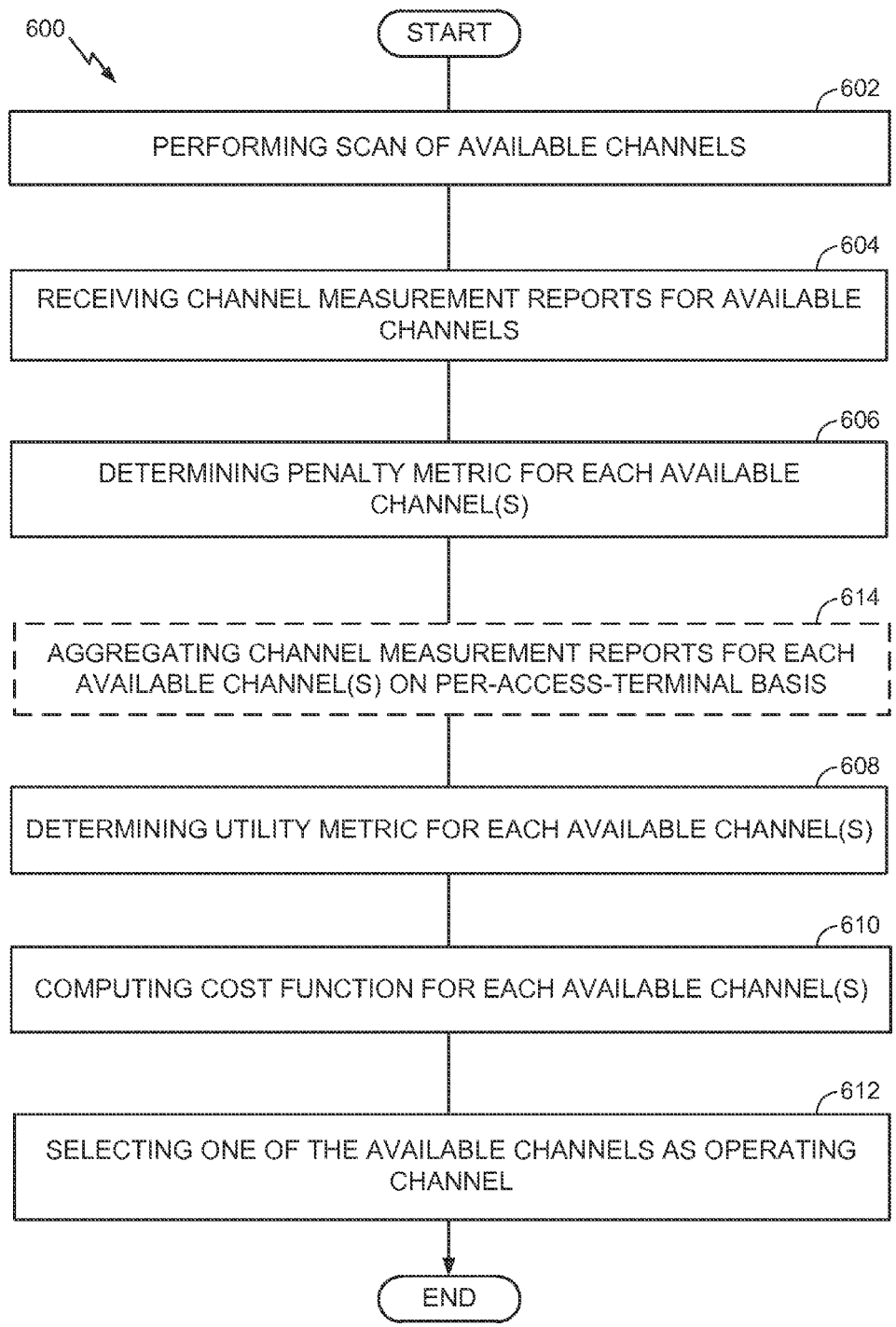
FIG. 6 is a flow diagram illustrating an example method of managing an operating channel of a first Radio Access Technology (RAT) over a communication medium shared with a second RAT in accordance with the techniques herein.

FIG. 6 is a flow diagram illustrating an example method of managing an operating channel of a first RAT over a communication medium shared with a second RAT in accordance with the techniques described above. As a particular example, the first RAT may include LTE technology, the second RAT may include Wi-Fi technology, and the operating channel may include a channel in an unlicensed band of frequencies. The method 600 may be performed, for example, by an access point (e.g., the access point 110 illustrated in FIG. 1).

As shown, the access point may perform (e.g., via one or more transceivers such as the RAT transceiver 140 and/or the RAT B transceiver 142) a scan of available channels (block 602) and receive (e.g., via one or more transceivers or the like such as the RAT transceiver 140 and/or the RAT B transceiver 142), from an access terminal such as the access terminal 120, channel measurement reports for the available channels (block 604). Based on the channel scan, the access point may determine (e.g., via a penalty metric generator or the like such as the penalty metric generator 202) a penalty metric for each of the available channels (block 606). Based on the channel measurement reports, the access point may determine (e.g., via a utility metric generator or the like such as the utility metric generator 204) a utility metric for each of the available channels (block 608). The access point may then compute (e.g., via a cost function generator or the like such as the cost function generator 206) a cost function for each of the available channels based on the respective penalty metrics and the respective utility metrics (block 610). Based on a comparison of the cost functions for each of the available channels, the access point may select (e.g., via a channel selector or the like such as the channel selector 208) one of the available channels as the operating channel (block 612).

As discussed in more detail above, the penalty metrics, the utility metrics, or a combination thereof may correspond, for example, to a proportional fair throughput metric.

More specifically, the penalty metrics may correspond, for example, to a measure of a performance benefit provided by selecting a respective channel as the operating channel. The channel scan may identify a signal strength measurement for each of the available channels, for example, such that the access point determines the penalty metrics as a function of the signal strength measurements.

Conversely, the utility metrics may correspond, for example, to a measure of a performance impact caused by selecting a respective channel as the operating channel. The channel measurement reports may include a signal strength measurement for the access point and a signal strength measurement for one or more neighboring access points visible to the access terminal, for example, such that the access point determines the utility metrics as a function of the signal strength measurements.

In some designs, the channel measurement reports may be received from multiple access terminals operating in accordance with different RATs. For example, the access point may receive (i) via a first transceiver configured to operate in accordance with the first RAT and from a first access terminal configured to operate in accordance with the first RAT, a first channel measurement report for each of the available channels, and (ii) via a second transceiver configured to operate in accordance with the second RAT and from a second access terminal configured to operate in accordance with the second RAT, a second channel measurement report for each of the available channels.

Returning to FIG. 6, in some designs, the access point may also optionally aggregate (e.g., via a pre-processing unit or the like such as the pre-processing unit 210) the channel measurement reports for each of the available channels on a per-access-terminal basis (optional block 614), with the utility metric for each of the available channels being determined based on the aggregated channel measurement reports. As an example, the aggregating may comprise aggregating the channel measurement reports by generating a linear sum of at least two measurements associated with a corresponding at least one of the available channels. The at least two measurements may correspond to different neighboring access points.

Figure 7:
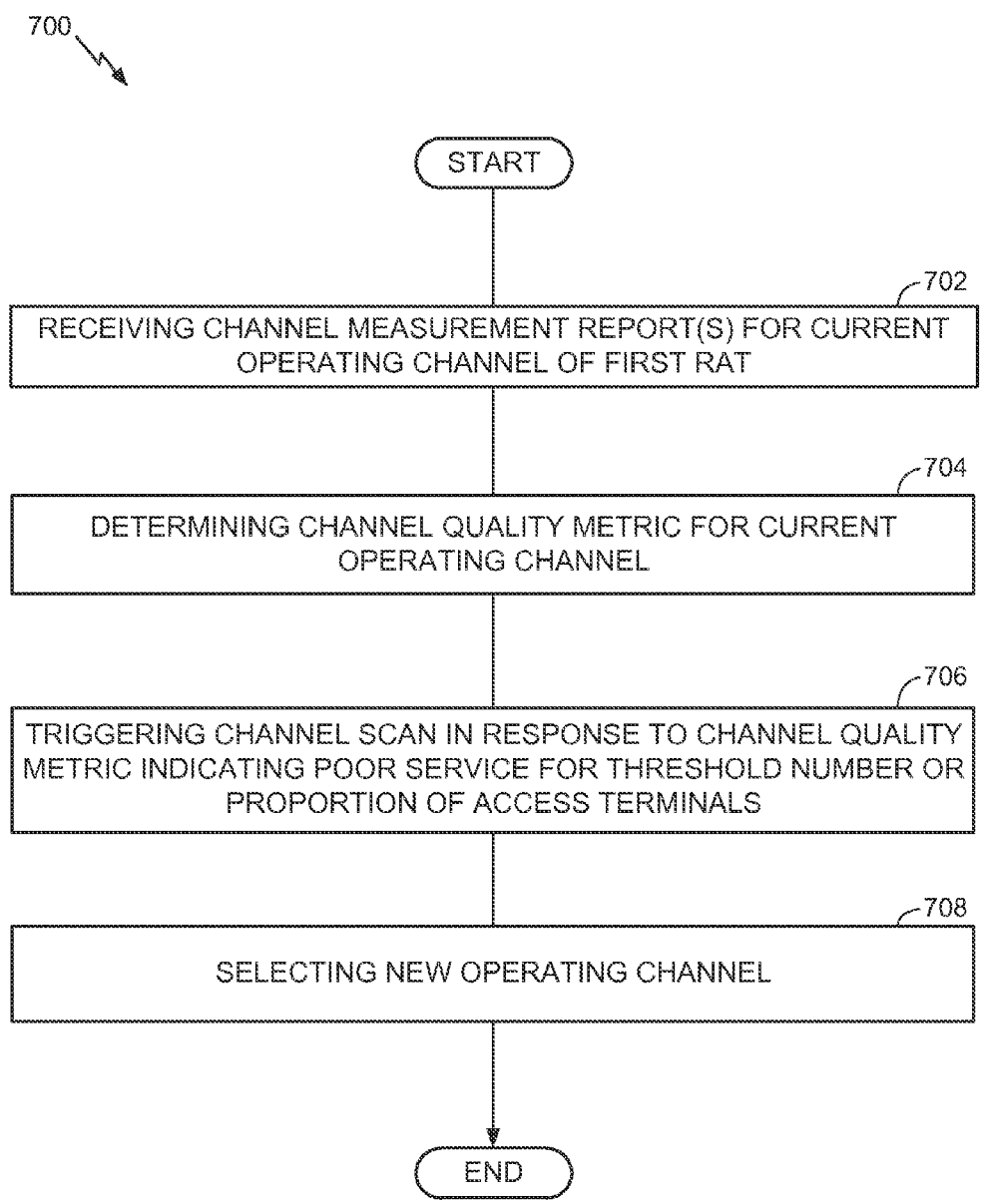
FIG. 7 is a flow diagram illustrating another example method of managing an operating channel of a first RAT over a communication medium shared with a second RAT in accordance with the techniques herein.

FIG. 7 is a flow diagram illustrating another example method of managing an operating channel of a first RAT over a communication medium shared with a second RAT in accordance with the techniques described above. As a particular example, the first RAT may include LTE technology, the second RAT may include Wi-Fi technology, and the operating channel may include a channel in an unlicensed band of frequencies. The method 700 may be performed, for example, by an access point (e.g., the access point 110 illustrated in FIG. 1).

As shown, the access point may receive (e.g., via one or more transceivers or the like such as the RAT transceiver 140 and/or the RAT B transceiver 142), from each of a plurality of access terminals such as the access terminal 120, one or more channel measurement reports for a current operating channel of the first RAT (block 702). Based on the channel measurement reports, the access point may determine (e.g., via a channel quality analyzer or the like such as the channel quality analyzer 302) a channel quality metric for the current operating channel (block 704). The access point may then trigger (e.g., via a channel scanner or the like such as the channel scanner 304) a channel scan in response to the channel quality metric indicating poor service for a threshold number or proportion of the access terminals (block 706). Based on the channel scan, the access point may select (e.g., via a channel selector or the like such as the channel selector 306) a new operating channel based on the channel scan (block 708).

As discussed in more detail above, the poor service may correspond, for example, to a service level below a service level threshold. The service level threshold may correspond to a predetermined minimum level of service. Alternatively, the service level threshold may correspond to a dynamic minimum level of service derived from (i) an expected service level based on first RAT signaling and (ii) an offset value.

In some designs, the access point may also optionally set (e.g., via a channel scanner or the like such as the channel scanner 304) the threshold number or proportion of the access terminals dynamically. The threshold number or proportion of the access terminals may be generally non-trivial (e.g., greater than one access terminal).

The triggering of the channel scan (block 706) may be further in response to the channel quality metric indicating the poor service for a threshold amount of time, which may be set, for example, based on a Discontinuous Reception (DRX) configuration of the access terminals.

The determining of the channel quality metric (block 704) may be based, for example, on a CQI, a PER, a MCS, or a combination thereof, from the channel measurement reports.

In some cases, the new operating channel may be different from the current operating channel. In other cases, when no better channels are identified, the new operating channel may be the same as the current operating channel.

Figure 8:
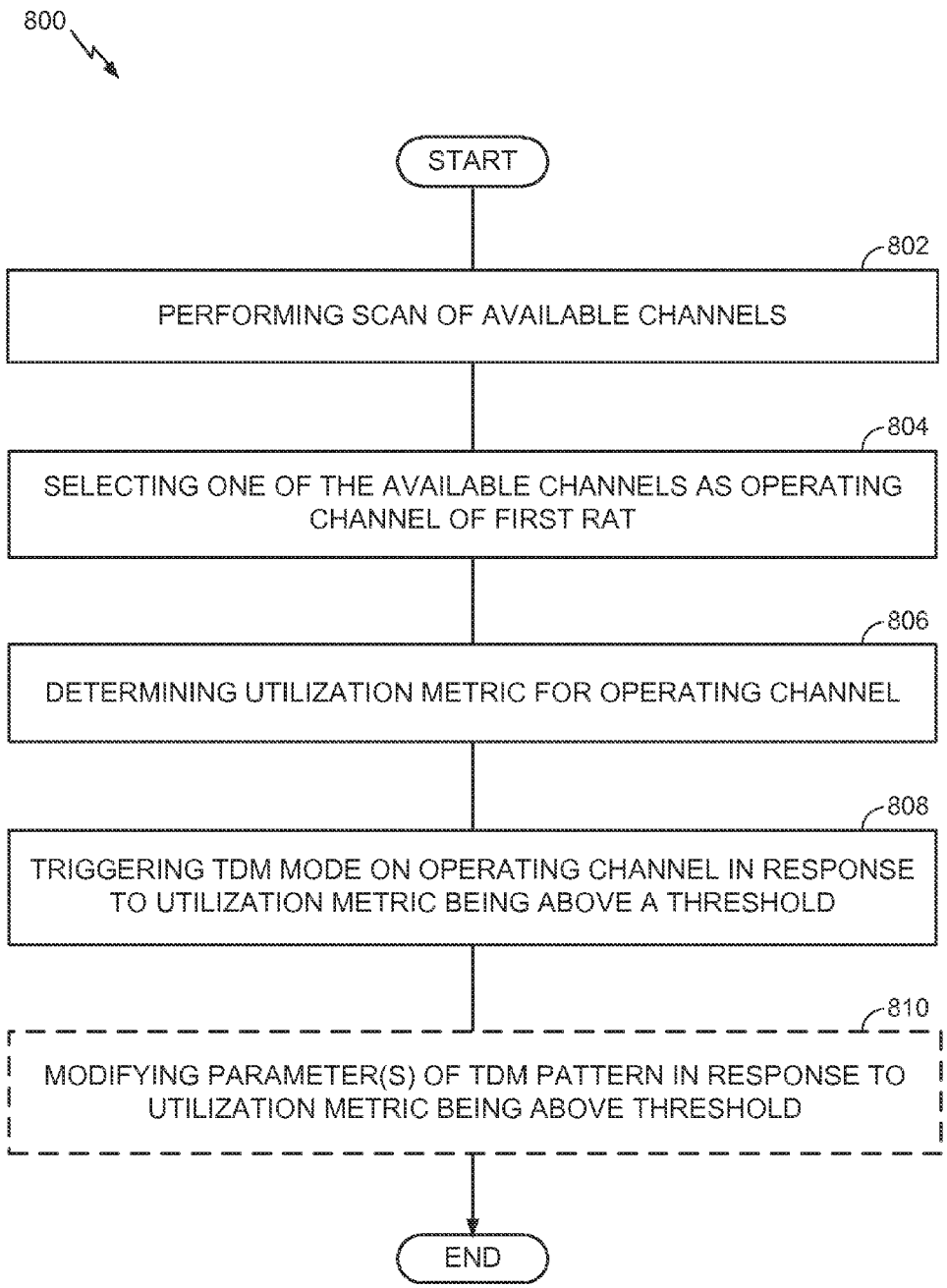
FIG. 8 is a flow diagram illustrating another example method of managing an operating channel of a first RAT over a communication medium shared with a second RAT in accordance with the techniques herein.

FIG. 8 is a flow diagram illustrating another example method of managing an operating channel of a first RAT over a communication medium shared with a second RAT in accordance with the techniques described above. As a particular example, the first RAT may include LTE technology, the second RAT may include Wi-Fi technology, and the operating channel may include a channel in an unlicensed band of frequencies. The method 800 may be performed, for example, by an access point (e.g., the access point 110 illustrated in FIG. 1).

As shown, the access point may perform (e.g., via one or more transceivers or the like such as the RAT transceiver 140 and/or the RAT B transceiver 142) a scan of available channels (block 802). Based on the channel scan, the access point may select (e.g., via a channel selector or the like such as the channel selector 402) one of the available channels as the operating channel of the first RAT (block 804). The access point may also determine (e.g., via an interference analyzer or the like such as the interference analyzer 404) a utilization metric for the operating channel (block 806). The access point may then triggering (e.g., via an operating mode controller or the like such as the operating mode controller 406) a TDM mode on the operating channel in response to the utilization metric being above a threshold (block 808). The TDM mode may be used to cycle operation between activated periods and deactivated periods of communication in accordance with a TDM communication pattern.

As discussed in more detail above, the utilization metric may correspond, for example, to a measure of interference from signaling on the operating channel that is associated with the second RAT. Here, the signaling may correspond to one or more beacons on a primary channel or a secondary channel that are associated with the second RAT and exceed a signal strength threshold. The triggering (block 808) may comprise triggering the TDM mode with (i) a first set of parameters for the TDM pattern based on the one or more beacons exceeding a threshold number on the primary channel or (ii) a second set of parameters for the TDM pattern based on the one or more beacons exceeding a threshold number on the secondary channel.

The utilization metric may also correspond, for example, to a measure of interference from signaling on the operating channel that is associated with the first RAT. Here, the triggering (block 808) may comprise triggering the TDM mode with (i) a first set of parameters for the TDM pattern based on the signaling identifying at least a threshold number of access points operating in accordance with the first RAT on the operating channel or (ii) a second set of parameters for the TDM pattern based on the signaling identifying less than a threshold number of access points operating in accordance with the first RAT on the operating channel.

In some designs, the access point may also optionally modify (e.g., via an operating mode controller or the like such as the operating mode controller 406) one or more parameters of the TDM pattern in response to the utilization metric being above the threshold (optional block 810). The modifying may comprise modifying one or more parameters of the TDM pattern at a next scheduled channel scan. As an example, the one or more parameters may include a duty cycle, a transmission power, or a cycle timing of the TDM pattern.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 9:
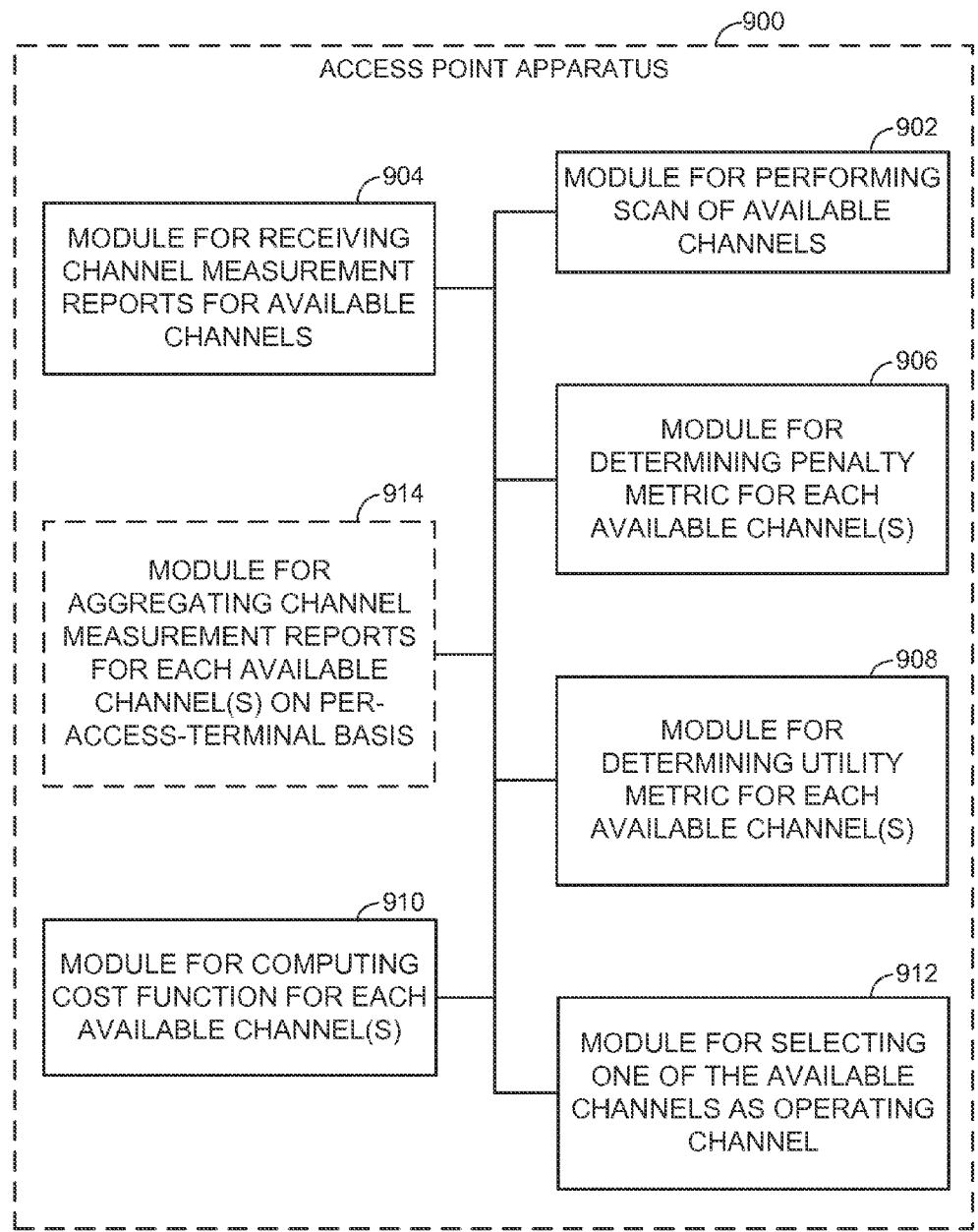
FIGS. 9-11 provide alternative illustrations of apparatuses for implementing an access point and/or an access terminal represented as a series of interrelated functional modules.
Figure 10:
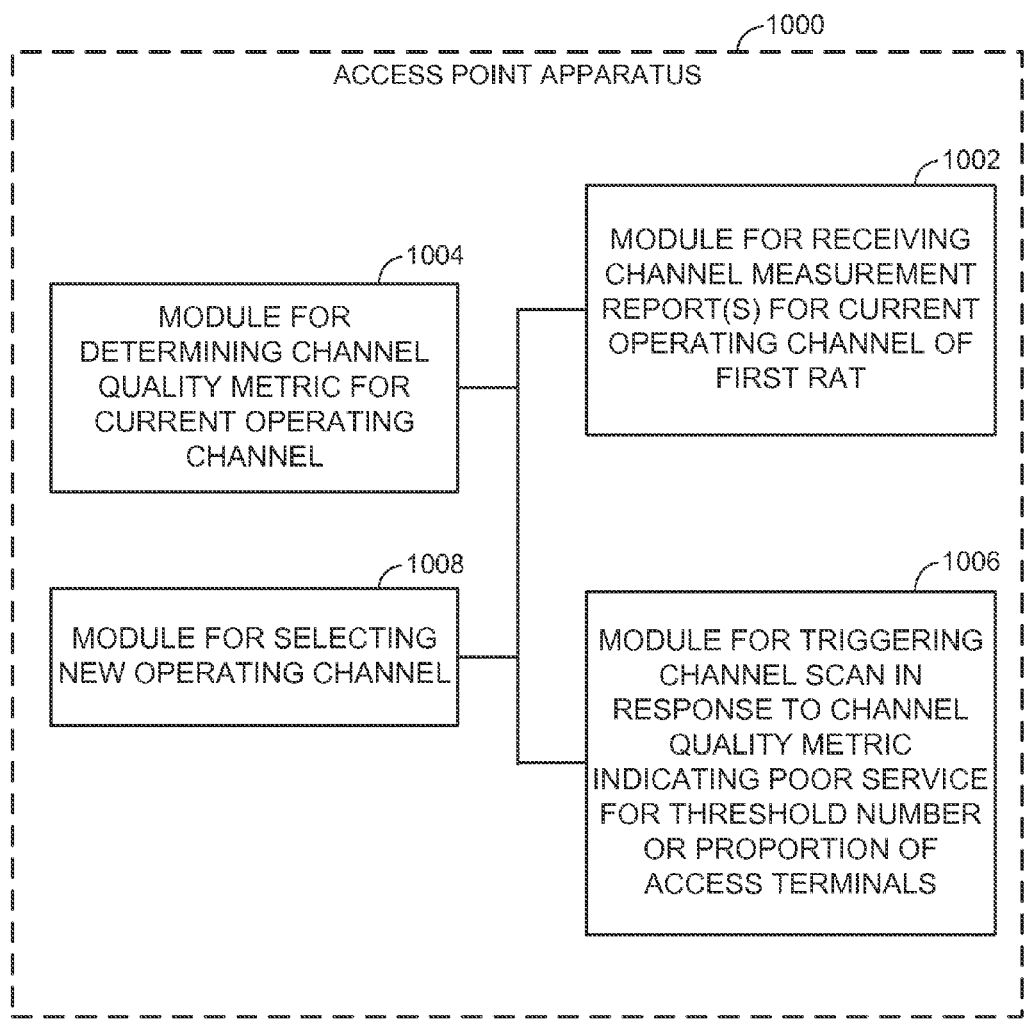
Figure 11:
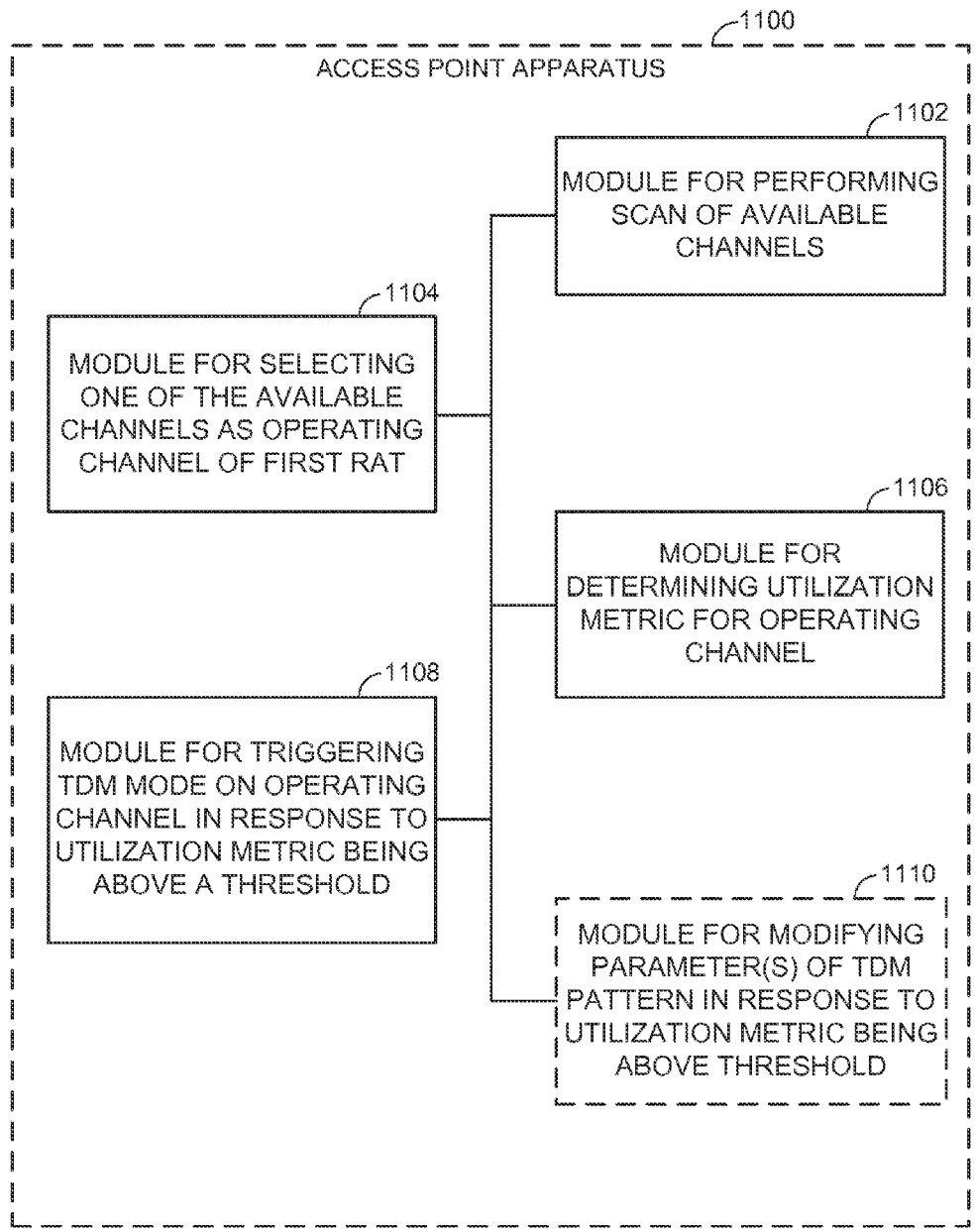

FIGS. 9-11 provide alternative illustrations of apparatuses for implementing the access point 110 and/or the access terminal 120 represented as a series of interrelated functional modules.

FIG. 9 illustrates an example access point apparatus 900 represented as a series of interrelated functional modules. A module for performing 902 may correspond at least in some aspects to, for example, a communication device or a component thereof as discussed herein (e.g., the communication device 112 or the like). A module for receiving 904 may correspond at least in some aspects to, for example, a communication device or a component thereof as discussed herein (e.g., the communication device 112 or the like). A module for determining 906 may correspond at least in some aspects to, for example, a communication controller or a component thereof as discussed herein (e.g., the communication controller 114 or the like). A module for determining 908 may correspond at least in some aspects to, for example, a communication controller or a component thereof as discussed herein (e.g., the communication controller 114 or the like). An module for computing 910 may correspond at least in some aspects to, for example, a communication controller or a component thereof as discussed herein (e.g., the communication controller 114 or the like). An module for selecting 912 may correspond at least in some aspects to, for example, a communication controller or a component thereof as discussed herein (e.g., the communication controller 114 or the like). An optional module for aggregating 914 may correspond at least in some aspects to, for example, a communication controller or a component thereof as discussed herein (e.g., the communication controller 114 or the like).

FIG. 10 illustrates an example access point apparatus 1000 represented as a series of interrelated functional modules. A module for receiving 1002 may correspond at least in some aspects to, for example, a communication device or a component thereof as discussed herein (e.g., the communication device 112 or the like). A module for determining 1004 may correspond at least in some aspects to, for example, a communication controller or a component thereof as discussed herein (e.g., the communication controller 114 or the like). A module for triggering 1006 may correspond at least in some aspects to, for example, a communication controller or a component thereof as discussed herein (e.g., the communication controller 114 or the like). A module for selecting 1008 may correspond at least in some aspects to, for example, a communication controller or a component thereof as discussed herein (e.g., the communication controller 114 or the like).

FIG. 11 illustrates an example access point apparatus 1100 represented as a series of interrelated functional modules. A module for performing 1102 may correspond at least in some aspects to, for example, a communication device or a component thereof as discussed herein (e.g., the communication device 112 or the like). A module for selecting 1104 may correspond at least in some aspects to, for example, a communication controller or a component thereof as discussed herein (e.g., the communication controller 114 or the like). A module for determining 1106 may correspond at least in some aspects to, for example, a communication controller or a component thereof as discussed herein (e.g., the communication controller 114 or the like). A module for triggering 1108 may correspond at least in some aspects to, for example, a communication controller or a component thereof as discussed herein (e.g., the communication controller 114 or the like). An optional module for modifying 1110 may correspond at least in some aspects to, for example, a communication controller or a component thereof as discussed herein (e.g., the communication controller 114 or the like).

The functionality of the modules of FIGS. 9-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9-11, as well as other components and functions described herein, may be implemented using any suitable means. Such means also may be implemented, at least in part, using corresponding structure as taught herein. For example, the components described above in conjunction with the "module for" components of FIGS. 9-11 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication management between RATs sharing operating spectrum in an unlicensed band of radio frequencies. As an example, such a computer-readable medium may include code for performing, at an access point, a scan of available channels; code for receiving, from an access terminal, channel measurement reports for the available channels; code for determining a penalty metric for each of the available channels based on the channel scan; code for determining a utility metric for each of the available channels based on the channel measurement reports; code for computing a cost function for each of the available channels based on the respective penalty metrics and the respective utility metrics; and code for selecting one of the available channels as the operating channel based on a comparison of the cost functions for each of the available channels. As another example, such a computer-readable medium may include code for receiving from each of a plurality of access terminals one or more channel measurement reports for a current operating channel of the first RAT; code for determining a channel quality metric for the current operating channel based on the channel measurement reports; code for triggering a channel scan in response to the channel quality metric indicating poor service for a threshold number or proportion of the access terminals; and code for selecting a new operating channel based on the channel scan. As another example, such a computer-readable medium may include code for performing, at an access point, a scan of available channels; code for selecting one of the available channels as the operating channel of the first RAT based on the channel scan; code for determining a utilization metric for the operating channel; and code for triggering a TDM mode on the operating channel in response to the utilization metric being above a threshold, wherein the TDM mode cycles operation between activated periods and deactivated periods of communication in accordance with a TDM communication pattern.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An access point apparatus for managing an operating channel of a first Radio Access Technology (RAT) over a communication medium shared with a second RAT, comprising:
    one or more transceivers configured to perform at the access point a scan of available channels and to receive from an access terminal channel measurement reports for the available channels;
    a penalty metric generator configured to determine a penalty metric for each of the available channels based on the channel scan;
    a utility metric generator configured to determine a utility metric for each of the available channels based on the channel measurement reports;
    a cost function generator configured to compute a cost function for each of the available channels based on the respective penalty metrics and the respective utility metrics; and
    a channel selector configured to select one of the available channels as the operating channel based on a comparison of the cost functions for each of the available channels,
    wherein the utility metrics correspond to a measure of a performance impact caused by selecting a respective channel as the operating channel, and
    wherein the channel measurement reports include a signal strength measurement for the access point and a signal strength measurement for one or more neighboring access points visible to the access terminal, the utility metric generator being configured to determine the utility metrics as a function of the signal strength measurements.

2. The access point apparatus of claim 1, wherein at least one of the penalty metrics, the utility metrics, or a combination thereof corresponds to a proportional fair throughput metric.

3. The access point apparatus of claim 1, wherein the penalty metrics correspond to a measure of a performance benefit provided by selecting a respective channel as the operating channel.

4. The access point apparatus of claim 3, wherein the channel scan identifies a signal strength measurement for each of the available channels, the penalty metric generator being configured to determine the penalty metrics as a function of the signal strength measurements.

5. The access point apparatus of claim 1, wherein the one or more transceivers comprise:
    a first transceiver configured to operate in accordance with the first RAT and to receive, from a first access terminal configured to operate in accordance with the first RAT, a first channel measurement report for each of the available channels; and
    a second transceiver configured to operate in accordance with the second RAT and to receive, from a second access terminal configured to operate in accordance with the second RAT, a second channel measurement report for each of the available channels.

6. The access point apparatus of claim 1, further comprising:
    a pre-processing unit configured to aggregate the channel measurement reports for each of the available channels on a per-access-terminal basis, wherein
    the utility metric generator is configured to determine the utility metric for each of the available channels based on the aggregated channel measurement reports.

7. The access point apparatus of claim 6, wherein the pre-processing unit is configured to aggregate the channel measurement reports by generating a linear sum of at least two measurements associated with a corresponding at least one of the available channels.

8. The access point apparatus of claim 7, wherein the at least two measurements correspond to different neighboring access points.

9. The access point apparatus of claim 1, wherein:
    the first RAT comprises Long Term Evolution (LTE) technology;
    the second RAT comprises Wi-Fi technology; and
    the operating channel comprises a channel in an unlicensed band of frequencies.

10. A method for managing an operating channel of a first Radio Access Technology (RAT) over a communication medium shared with a second RAT, comprising:
   performing, at an access point, a scan of available channels;
   receiving, from an access terminal, channel measurement reports for the available channels;
   determining a penalty metric for each of the available channels based on the channel scan;
   determining a utility metric for each of the available channels based on the channel measurement reports;
   computing a cost function for each of the available channels based on the respective penalty metrics and the respective utility metrics; and
   selecting one of the available channels as the operating channel based on a comparison of the cost functions for each of the available channels,
   wherein the utility metrics correspond to a measure of a performance impact caused by selecting a respective channel as the operating channel,
   wherein the channel measurement reports include a signal strength measurement for the access point and a signal strength measurement for one or more neighboring access points visible to the access terminal, and
   wherein the utility metrics are determined as a function of the signal strength measurements.

11. The method of claim 10, wherein at least one of the penalty metrics, the utility metrics, or a combination thereof corresponds to a proportional fair throughput metric.

12. The method of claim 10, wherein the penalty metrics correspond to a measure of a performance benefit provided by selecting a respective channel as the operating channel.

13. The method of claim 12, wherein the channel scan identifies a signal strength measurement for each of the available channels, the method further comprising determining the penalty metrics as a function of the signal strength measurements.

14. The method of claim 10, wherein the receiving comprises:
   receiving, via a first transceiver configured to operate in accordance with the first RAT and from a first access terminal configured to operate in accordance with the first RAT, a first channel measurement report for each of the available channels; and
   receiving, via a second transceiver configured to operate in accordance with the second RAT and from a second access terminal configured to operate in accordance with the second RAT, a second channel measurement report for each of the available channels.

15. The method of claim 10, further comprising:
   aggregating the channel measurement reports for each of the available channels on a per-access-terminal basis; and
   determining the utility metric for each of the available channels based on the aggregated channel measurement reports.

16. The method of claim 15, wherein the aggregating comprises aggregating the channel measurement reports by generating a linear sum of at least two measurements associated with a corresponding at least one of the available channels.

17. The method of claim 16, wherein the at least two measurements correspond to different neighboring access points.

18. The method of claim 10, wherein:
   the first RAT comprises Long Term Evolution (LTE) technology;
   the second RAT comprises Wi-Fi technology; and
   the operating channel comprises a channel in an unlicensed band of frequencies.

19. An apparatus for managing an operating channel of a first Radio Access Technology (RAT) over a communication medium shared with a second RAT, comprising:
   means for performing, at an access point, a scan of available channels;
   means for receiving, from an access terminal, channel measurement reports for the available channels;
   means for determining a penalty metric for each of the available channels based on the channel scan;
   means for determining a utility metric for each of the available channels based on the channel measurement reports;
   means for computing a cost function for each of the available channels based on the respective penalty metrics and the respective utility metrics; and
   means for selecting one of the available channels as the operating channel based on a comparison of the cost functions for each of the available channels,
   wherein the utility metrics correspond to a measure of a performance impact caused by selecting a respective channel as the operating channel, and
   wherein the channel measurement reports include a signal strength measurement for the access point and a signal strength measurement for one or more neighboring access points visible to the access terminal, the means for determining a utility metric being configured to determine the utility metrics as a function of the signal strength measurements.

20. The apparatus of claim 19, wherein the penalty metrics correspond to a measure of a performance benefit provided by selecting a respective channel as the operating channel.

21. The apparatus of claim 19, further comprising:
   means for aggregating the channel measurement reports for each of the available channels on a per-access-terminal basis; and
   means for determining the utility metric for each of the available channels based on the aggregated channel measurement reports.

22. A non-transitory computer-readable medium comprising code, which, when executed by a processor, causes the processor to perform operations for managing an operating channel of a first Radio Access Technology (RAT) over a communication medium shared with a second RAT, the non-transitory computer-readable medium comprising:
   code for performing, at an access point, a scan of available channels;
   code for receiving, from an access terminal, channel measurement reports for the available channels;
   code for determining a penalty metric for each of the available channels based on the channel scan;
   code for determining a utility metric for each of the available channels based on the channel measurement reports;
   code for computing a cost function for each of the available channels based on the respective penalty metrics and the respective utility metrics; and
   code for selecting one of the available channels as the operating channel based on a comparison of the cost functions for each of the available channels,
   wherein the utility metrics correspond to a measure of a performance impact caused by selecting a respective channel as the operating channel, and wherein the channel measurement reports include a signal strength measurement for the access point and a signal strength measurement for one or more neighboring access points visible to the access terminal, the code for determining a utility metric a utility metric including code to determine the utility metrics as a function of the signal strength measurements.

23. The non-transitory computer-readable medium of claim 22, wherein the penalty metrics correspond to a measure of a performance benefit provided by selecting a respective channel as the operating channel.

24. The non-transitory computer-readable medium of claim 22, further comprising:
- code for aggregating the channel measurement reports for each of the available channels on a per-access-terminal basis; and
- code for determining the utility metric for each of the available channels based on the aggregated channel measurement reports.

* * * * *